US011457050B1

(12) United States Patent
Kolev et al.

(10) Patent No.: US 11,457,050 B1
(45) Date of Patent: Sep. 27, 2022

(54) EPHEMERAL DATA STREAM SERVICE

(71) Applicant: Amazon Technologies, Inc., Seattle, WA (US)

(72) Inventors: Georgi Petev Kolev, Cambridge (GB); Didier Wenzek, Cambridge (GB); Carl Summers, Cambridge (GB); Gabriel Theodoro, Cambridge (GB); Mikhail Erofeev, CamibrIdge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/117,663

(22) Filed: Dec. 10, 2020

(51) Int. Cl.
| | |
|---|---|
| *G06F 15/16* | (2006.01) |
| *H04L 65/61* | (2022.01) |
| *H04L 67/02* | (2022.01) |
| *G06F 16/955* | (2019.01) |
| *H04L 65/65* | (2022.01) |
| *H04L 67/59* | (2022.01) |

(52) U.S. Cl.
CPC .......... *H04L 65/61* (2022.05); *G06F 16/9566* (2019.01); *H04L 65/65* (2022.05); *H04L 67/02* (2013.01); *H04L 67/59* (2022.05)

(58) Field of Classification Search
CPC ... H04L 65/4069; H04L 65/608; H04L 67/02; H04L 67/2861; G06F 16/9566
USPC ....................................................... 709/231
See application file for complete search history.

(56) References Cited

U.S. PATENT DOCUMENTS

| | | | |
|---|---|---|---|
| 11,146,569 B1 | 10/2021 | Brooker et al. | |
| 2012/0331144 A1 | 12/2012 | Supalov | |
| 2015/0120928 A1 | 4/2015 | Gummaraju et al. | |
| 2015/0248553 A1* | 9/2015 | Strand ..................... | G06F 21/45 726/6 |
| 2016/0142323 A1 | 5/2016 | Lehmann et al. | |
| 2016/0197706 A1* | 7/2016 | Lester ................. | H04W 12/108 709/226 |
| 2019/0075157 A1 | 3/2019 | Reber | |
| 2020/0175387 A1 | 6/2020 | Braz et al. | |
| 2020/0186445 A1 | 6/2020 | Govindaraju et al. | |
| 2020/0220937 A1* | 7/2020 | Jain ........................ | H04L 67/146 |
| 2020/0389403 A1 | 12/2020 | Buddhikot et al. | |
| 2020/0404573 A1* | 12/2020 | Athlur ................. | H04W 12/033 |
| 2021/0029142 A1 | 1/2021 | Rajasekaran et al. | |
| 2021/0266303 A1* | 8/2021 | Pollutro ............... | H04L 63/062 |

* cited by examiner

*Primary Examiner* — Alan S Chou
(74) *Attorney, Agent, or Firm* — Knobbe Martens Olson & Bear LLP (57) ABSTRACT

Systems and methods are described for communications between computing devices via an ephemeral data stream routing service, which allows the devices to establish a single-use connection for streaming arbitrary amounts of data. A computing device may request an ephemeral data stream from the ephemeral data stream routing service, which may respond by creating an endpoint and providing a single-use URL that locates the endpoint. The sending and receiving computing devices may then use the single-use URL to connect to the endpoint, which may be implemented on a single routing device or a pair of routing devices within the ephemeral data stream routing service. The service then relays a data stream from the sender to the receiver, and may forward the data stream from one routing device to another within the service as needed. The ephemeral data stream routing service then removes the endpoint and invalidates the single-use URL.

19 Claims, 6 Drawing Sheets

EPHEMERAL DATA STREAM SERVICE

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

In some scenarios, a user can request that a data center provide computing resources. The computing resources may correspond to, e.g., storage devices, resources that perform a particular computing function such as data encryption or processing, or resources that execute a particular set of computer-executable instructions on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to facilitating communication between computing devices. More specifically, the present disclosure relates to facilitating data stream communications between computing devices in a manner that does not require the devices to directly connect to one another. Typically, a first computing device may transmit a data stream to a second device by connecting to the second device directly, using a uniform resource locator ("URL"), Internet Protocol address ("IP address"), or other identifier that enables direct communication with the second device. However, in some instances it may not be possible to make a direct connection. For example, one or both devices may be behind a firewall or network address translation ("NAT") service that prevents or interferes with receiving an incoming connection, or one of the devices may be in a remote computing environment (e.g., a serverless computing environment) that limits direct access or that limits the amount of data that can be directly transferred.

The term "serverless computing environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based computing environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

Because a serverless computing environment abstracts away responsibility for managing and configuring the underlying execution environment, a user may be unable to access components of this execution environment directly. For example, the user may be unable to transmit input data directly to code executing in a serverless computing environment, because the user may not know how to access (or may not have permission to access) the physical or virtual computing device that executes the code. Similarly, it may not be possible for code executing in a serverless computing environment to return response data to a user via the same network connection used to request execution of the code, since that connection may be made by a calling device to a "frontend" or similar gateway. In some aspects, this frontend or gateway may provide for transmission of a limited amount of data from a client as part of a request to execute code. For example, the serverless computing environment may provide an API for requesting code execution, and the user may be able to include some amount of data (e.g., as a payload of the request) when making the API call. The API may similarly allow the code to output a limited amount of data when reporting completion of the request. However, these techniques will typically allow only a limited quantity of information to be exchanged.

Other computing environments may similarly limit direct exchange of data between computing devices for reasons such as security or network administration. For example, two devices that are behind respective firewalls or NATs may both be able to make outbound connections, but have limited ability to accept inbound connections and thus be unable to make a direct connection with each other.

To overcome these limitations, a user may adopt alternative data transmission approaches. For example, a user may upload data to a temporary location, and then pass the temporary location to the receiving computing device to allow that device to download the data. However, this technique requires the user to acquire a temporary location, upload the data to it, and then remove the data once the receiving computing device has completed its download. This technique also typically requires the user to upload all of the data before the receiving computing device can begin downloading and processing it. Similarly, a remote computing device that outputs data may write the data to a temporary location and then inform the user of the location, but the user must again acquire a temporary location, wait until all of the data has been transmitted to the location, and then remove the data afterwards. The user may also incur costs associated with storing the data in a temporary location, or may encounter other issues (e.g., security, privacy, etc.) that make it undesirable to store the data online even temporarily.

To address these problems, an ephemeral data stream service may be used as described herein. The ephemeral data stream service may implement a connection "switchboard" that provides single-use uniform resource locators ("URLs") for establishing data stream connections between computing devices. The service thus allows the computing devices to send and receive data streams containing arbitrary amounts of data, without the use of temporary storage locations and without requiring that one device upload all of the data before the other device can begin downloading and processing the data.

As will be appreciated by one of skill in the art in light of the present disclosure, the embodiments disclosed herein improve the ability of computing systems to communicate in an efficient manner. Moreover, the presently disclosed embodiments address technical problems inherent within computing systems; specifically, the problems of communicating arbitrary amounts of data between computing environments for which direct access is limited. These technical problems are addressed by the various technical solutions described herein, including the implementation of an ephemeral data stream service to facilitate communicating arbitrary amounts of data. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
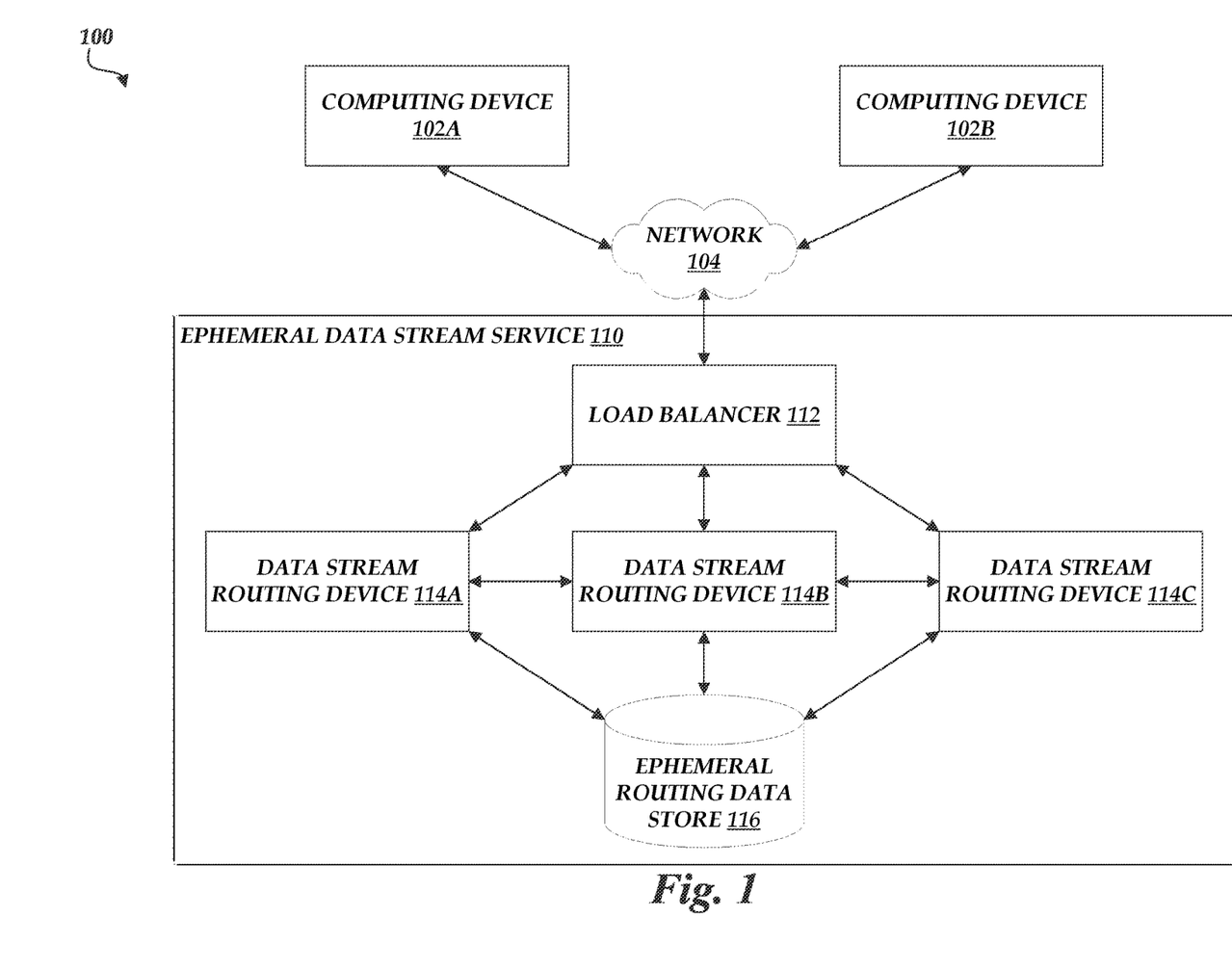
FIG. 1 is a block diagram depicting an example environment in which computing devices can transmit and receive data streams via an ephemeral data stream service in accordance with aspects of the present disclosure.

FIG. 1 is a block diagram of an example environment 100 in which a first computing device 102A and second computing device 102B may communicate with each other via an ephemeral data stream service 110. In the example environment 100, the computing devices 102A and 102B and the ephemeral data stream service 110 communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing devices 102A and 102B may generally be any computing devices that implement aspects of the present disclosure. Examples of such computing devices include a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, one or both of the computing devices 102A and 102B may be virtual computing devices, and may be instantiated in a serverless computing environment or other hosted computing environment (e.g., a data center). For example, the computing device 102B may be a virtual computing device that executes a task in a serverless computing environment on behalf of a user of the computing device 102A, and may transmit streaming data as output or receive streaming data as input in accordance with aspects of the present disclosure.

The example environment 100 further includes an ephemeral data stream service 110. As depicted, the ephemeral data stream service 110 includes a load balancer 112, which distributes incoming requests to establish ephemeral data streams to data stream routing devices 114A, 114B, and 114C, which are described in more detail with reference to FIG. 4 and may implement aspects of the present disclosure as described in more detail below. The ephemeral data stream service 110 further includes an ephemeral routing data store 116, which may illustratively be any non-transitory computer-readable medium that implements aspects of the present disclosure, including but not limited to a magnetic medium (e.g., a hard disk drive), optical medium, solid state device, flash drive, and the like. In some embodiments, the ephemeral routing data store 116 may be implemented as a database, database server, or other server. In various embodiments, the ephemeral routing data store 116 may be implemented as a single data store or multiple data stores. For example, the ephemeral routing data store 116 may be implemented as a local data store on each of the data stream routing devices 114A, 114B, and 114C rather than as a centralized data store that is shared by the routing devices.

It will be understood that the environment 100 may include more (or fewer) elements than those shown in FIG. 1. For example, the environment may include more (or fewer) data stream routing devices than the data stream routing devices 114A, 114B, and 114C. It is not necessary, however, that all of these elements be shown in order to provide an enabling disclosure.

Figure 2A:
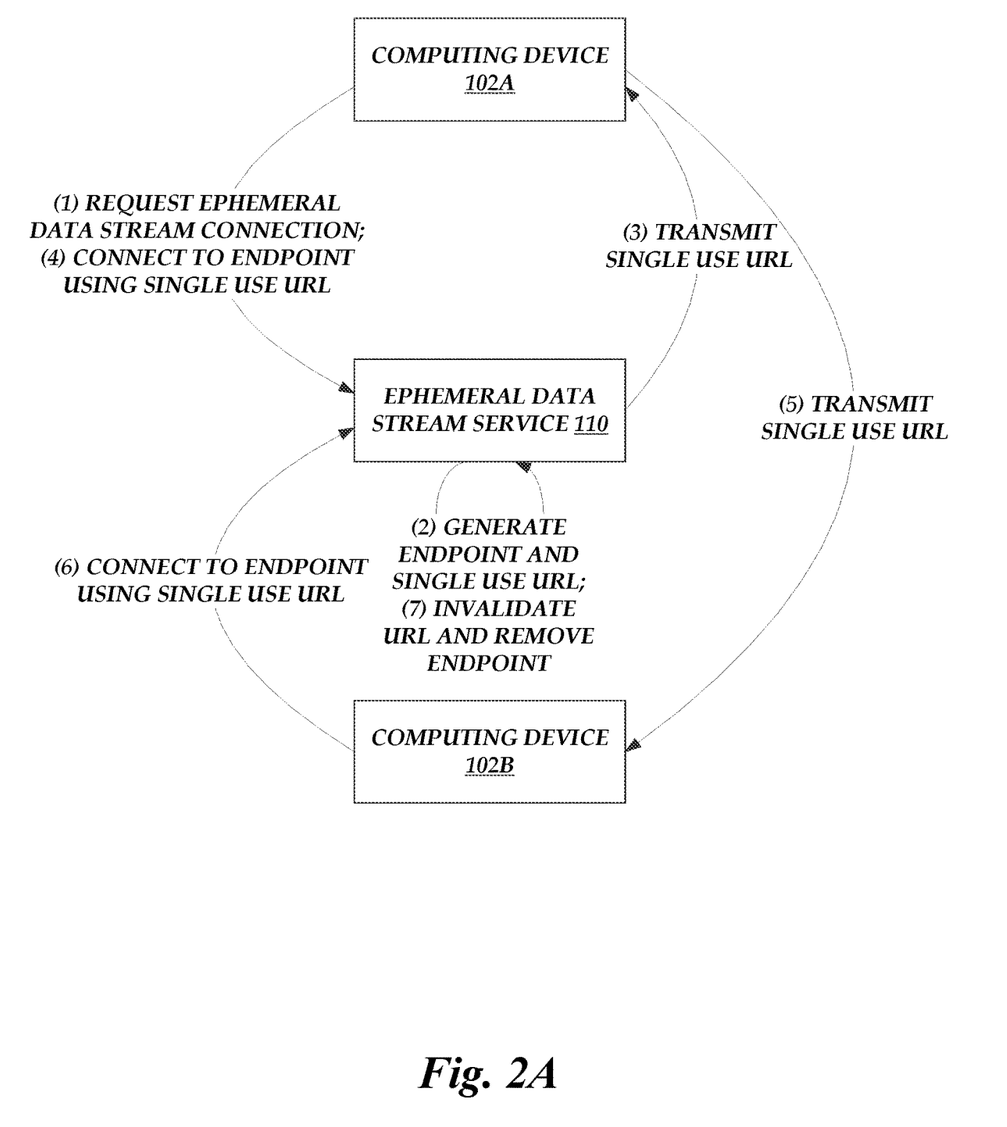
FIGS. 2A, 2B, and 2C are flow diagrams depicting example interactions for transmitting a data stream between computing devices via an ephemeral data stream service in accordance with aspects of the present disclosure.
Figure 2B:
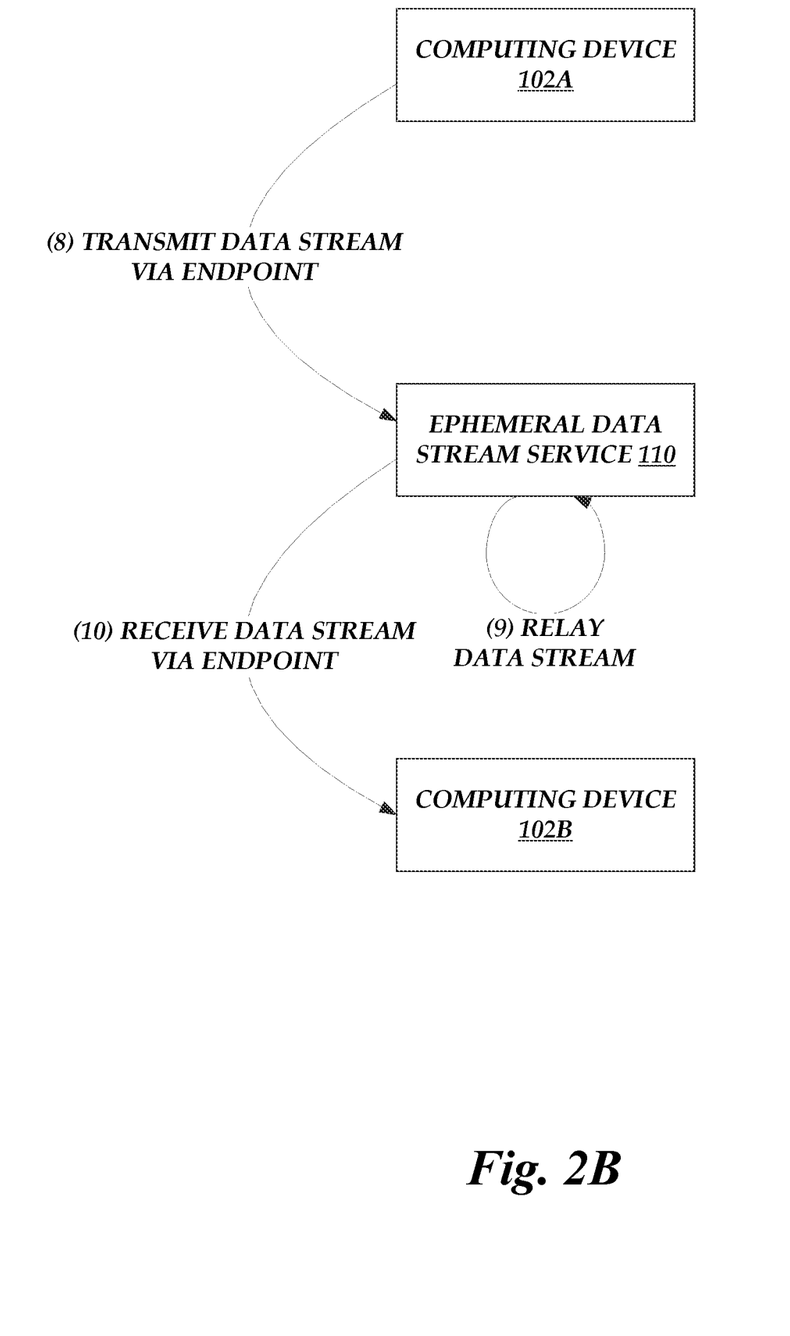
Figure 2C:
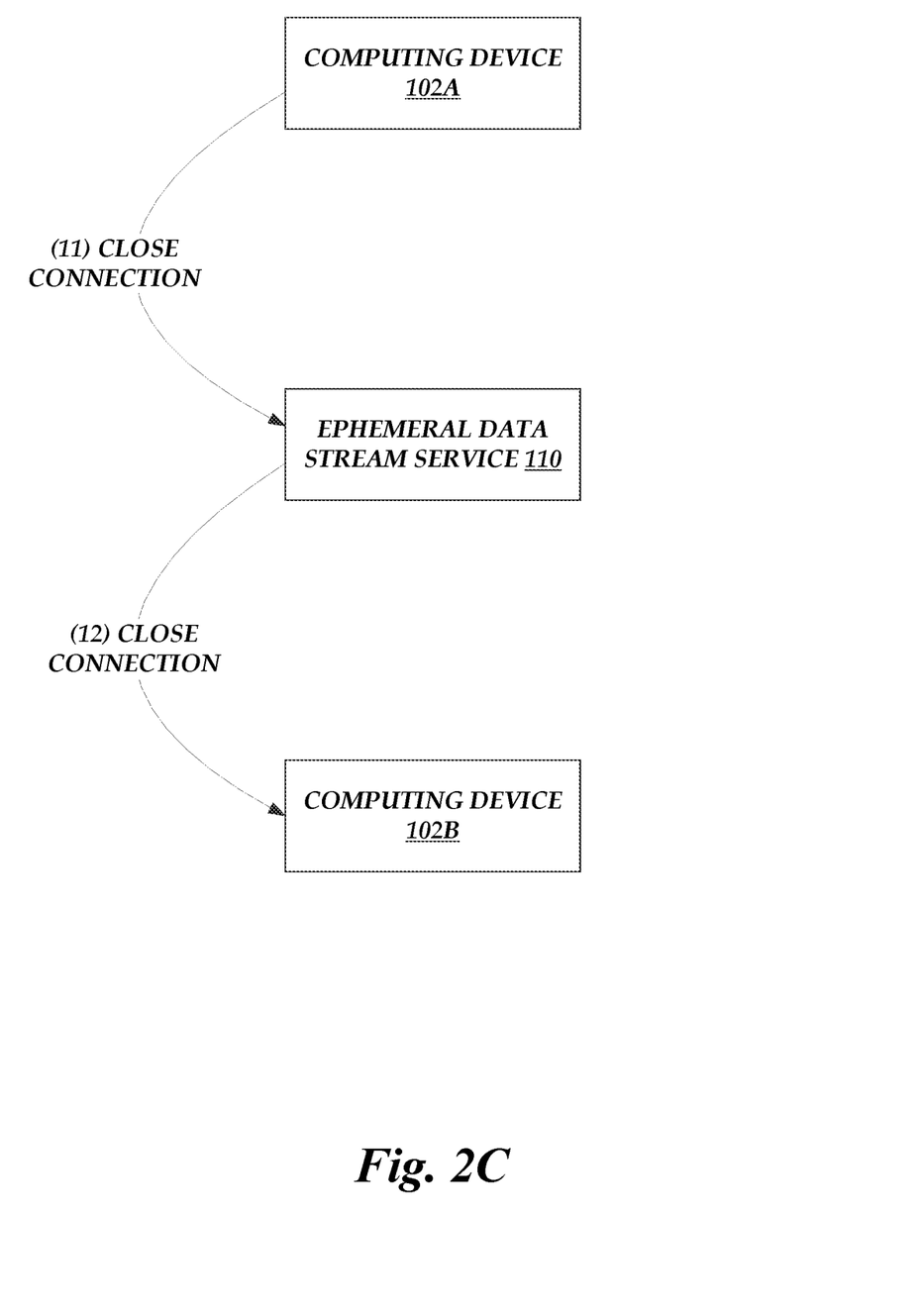

FIGS. 2A, 2B, and 2C depict illustrative interactions for establishing data stream communications between computing devices 102A and 102B using an ephemeral data stream service 110 in accordance with aspects of the present disclosure. At (1), the computing device 102A requests that the ephemeral data stream service 110 provide a URL that the computing device 102A can use to establish data stream communications with another computing device (e.g., the computing device 102B). In some embodiments, another computing device may request the URL on behalf of the computing device 102A, and may provide the URL to both computing devices 102A and 102B to allow those devices 102A and 102B to communicate via an ephemeral data stream in accordance with aspects of the present disclosure. In other embodiments, the interaction at (1) may be omitted and the ephemeral data stream service 110 may generate and transmit a single use URL in response to other events or criteria. For example, the ephemeral data stream service 110 may store a criterion indicating that a single use URL should be generated and transmitted at a particular time or when certain conditions are met.

At (2), the ephemeral data stream service 110 creates an endpoint and generates a single use URL that locates the endpoint. The endpoint is a resource provided by the ephemeral data stream service 110 that, as described herein, is used to establish and forward one data stream between two computing devices, and then is removed after a single use. It will be understood that "single use" in this context refers to the establishment of a single data stream between two computing devices (e.g., the computing devices 102A and 102B), and that the sending and receiving devices may each use the URL one time to locate and connect to the endpoint. The connection endpoint created at (2) is thus an endpoint for two connections that invoke the single use URL. In some embodiments, an endpoint may be "created" by the act of generating the single use URL, such that a separate act is not required to create the endpoint. For example, the ephemeral data stream service 110 may store (e.g., in the ephemeral routing data store 116) information that indicates which single use URLs have been generated and how many times they have been invoked, and may determine whether to accept or reject a connection that invokes a particular single use URL by consulting the table. In other embodiments, storing information regarding the validity of the single use URL may constitute creating the endpoint.

In some embodiments, as described in more detail below, the connections made to the endpoint may be received by two different ephemeral data stream routing devices (e.g., any two of the data stream routing devices 114A, 114B, and 114C depicted in FIG. 1). However, the endpoint is presented to external computing devices as one resource located by the single use URL, regardless of how many data stream routing devices are involved in its implementation. In other embodiments, the single use URL may be generated by a particular data stream routing device (e.g., the data stream routing device 114A), and may contain a prefix or other string that causes connections invoking the URL to be made to that data stream routing device. In such embodiments, the data stream routing device that generated the single use URL may store information locally regarding its validity rather than storing information about the single use URLs it creates in a common data store.

At (3), the ephemeral data stream service 110 transmits the single use URL to the computing device 102A, which at (4) uses the single use URL to establish a connection to the endpoint. Illustratively, the connection from the computing device 102A may be received and processed by a data stream routing device of the ephemeral data stream service 110 (e.g., the data stream routing device 114B depicted in FIG. 1), which may be assigned to handle the connection by a load balancer (e.g., the load balancer 112). In some embodiments, the assigned data stream routing device may write to a common data store (e.g., the ephemeral routing data store 116) to indicate that the single use URL has been used once and that the assigned data stream routing device has an open connection to the computing device 102A that invoked the single use URL. Additionally, in some embodiments, the computing device 102A may transmit an HTTP GET request or an HTTP PUT request to the endpoint, which may indicate whether the computing device 102A expects to receive streaming data or send streaming data.

In some embodiments, the interactions at (1) and (4) may be combined, such that the initial connection made by the computing device 102A at (1) becomes one of the endpoints of the data stream connection. In such embodiments, the single use URL may be transmitted to the computing device 102A via the connection established at (1), and then the data stream may be transmitted or received via the same connection, as described in more detail below. In other embodiments, the computing device 102A may request a single use URL, and then the computing device 102A (or, in some embodiments, another computing device) may connect to the endpoint using the single use URL.

At (5) the computing device 102A transmits the single use URL to the computing device 102B. In some embodiments, the computing device 102A may transmit the single use URL to the computing device 102B directly. For example, in embodiments where the computing device 102A can transmit a limited amount of data to the computing device 102B via an API call, the computing device 102A may transmit the single use URL as part of the API call. In other embodiments, the computing device 102A may transmit the single use URL indirectly. For example, the computing device 102A may transmit the single use URL to a third computing device, which may generate a data stream. The third computing device may then transmit the data stream and the single use URL to the computing device 102B, which may process the data stream (e.g., by encoding, decoding, converting, or filtering it), and then may transmit the processed data stream to the computing device 102A by invoking the single use URL.

At (6), the computing device 102B uses the single use URL to make its connection to the endpoint. In various embodiments, generating the single use URL, accepting the connection from the computing device 102A via the single use URL, and accepting the connection from the computing device 102B via the single use URL may carried out by the same data stream routing device, different routing devices, or various combinations thereof. For example, in some embodiments, a data stream routing device may generate a single use URL that resolves to that particular data stream routing device, and may thus ensure that both invocations of the single use URL connect to the same data stream routing device. In other embodiments, it may be undesirable (e.g., for load balancing reasons) to decide which data stream routing device will handle the data stream at the time the single use URL is requested. In such embodiments, the data stream routing devices may write information to a common data store (e.g., the ephemeral routing data store 116 depicted in FIG. 1) regarding single use URLs they have generated and connections they have received, and may use the information in this data store to bridge connections made between different data stream routing devices, as described in more detail below with reference to FIG. 3.

At (7), the ephemeral data stream service 110 responds to receiving a second connection to the endpoint by invalidating the single use URL and removing the endpoint. Illustratively, the single use URL may be invalidated by removing the entry in the common data store that indicated the single use URL had been created and was ready for use, by updating the common data store entry to indicate that the endpoint is no longer valid, or by updating an entry in a local data store to remove or invalidate the single use URL. In some embodiments, the interaction at (7) may be deferred until one of the computing devices 102A or 102B closes its connection to the endpoint (e.g., after the interaction at (11) and/or (12)).

With reference now to FIG. 2B, at (8), the computing device 102A begins transmitting the data stream via the single use URL. In some embodiments, the ephemeral data stream service 110 may indicate to the computing device 102A (e.g., using flow control mechanisms or other signals) that it is ready to begin the interaction at (8) once the computing device 102B has completed the interaction at (6) and established its connection to the endpoint. In other embodiments, the interactions at (4) and (6) may occur in the opposite order (i.e., the computing device 102B may connect first), and the ephemeral data stream service 110 may indicate that it is ready to begin the data stream as soon as the computing device 102A establishes its connection.

At (9), the ephemeral data stream service 110 relays the incoming data stream to the computing device 102B. In some embodiments, relaying the incoming data stream to the computing device 102B may include routing the incoming data stream from one data stream routing device (e.g., the data stream routing device 114C) to another (e.g., the data stream routing device 114B), depending on where the computing devices 102A and 102B have made their connections to the ephemeral data stream service 110. In other embodiments, the ephemeral data stream service 110 may deliberately or coincidentally cause both connections to be made to the same data stream routing device.

At (10), the computing device 102B receives the data stream via the single use URL. It will be understood that the interactions at (7), (8), and (9) will be carried out partially in parallel, such that the computing device 102B begins receiving portions of the data stream while the computing device 102A is still transmitting other portions of the data stream (and while the ephemeral data stream service 110 is still routing the portions in between). In some embodiments, the data stream may instead be transmitted by the computing device 102B and received by the computing device 102A, in which case the interactions at (8) and (10) are carried out in the other direction.

With reference now to FIG. 2C, at (11), the computing device 102A closes its connection to the ephemeral data stream service 110, or otherwise indicates that it has completed transmission of the data stream. In some embodiments, the interaction at (11) may be omitted and the connection between the ephemeral data stream service 110 and the computing device 102A may remain open. For example, the computing device 102A may transmit another request for an ephemeral data stream over the connection established at (4) (or, in some embodiments, over the connection established at (1)), and the interactions at (3) and (5)-(10) may be repeated.

At (12), the ephemeral data stream service 110 closes the connection to the computing device 102B. In some embodiments, the computing device 102B may instead close its connection to the ephemeral data stream service 110 while the computing device 102A is still sending streaming data. For example, the computing device 102B may encounter an error while processing the streaming data it has received, or may drop the connection due to network congestion or other issues. In embodiments where the ephemeral data stream service 110 defers invalidating the single use URL, as described above, the ephemeral data stream service 110 may thus invalidate the single use URL in response to either of the computing devices 102A or 102B disconnecting, or, in some embodiments, may allow the computing device 102B to re-establish its connection and resume or restart the data stream.

It will be understood that FIGS. 2A, 2B, and 2C are provided for purposes of example, and that many variations on the depicted interactions are within the scope of the present disclosure. For example, the single use URL may be obtained (e.g., from a pool of previously generated single use URLs, or from an external single use URL generator) rather than being generated at (2). As a further example, the interactions at (4) and (5) may be carried out in either order or in parallel. FIGS. 2A, 2B, and 2C are thus understood to be illustrative and not limiting.

Figure 3:
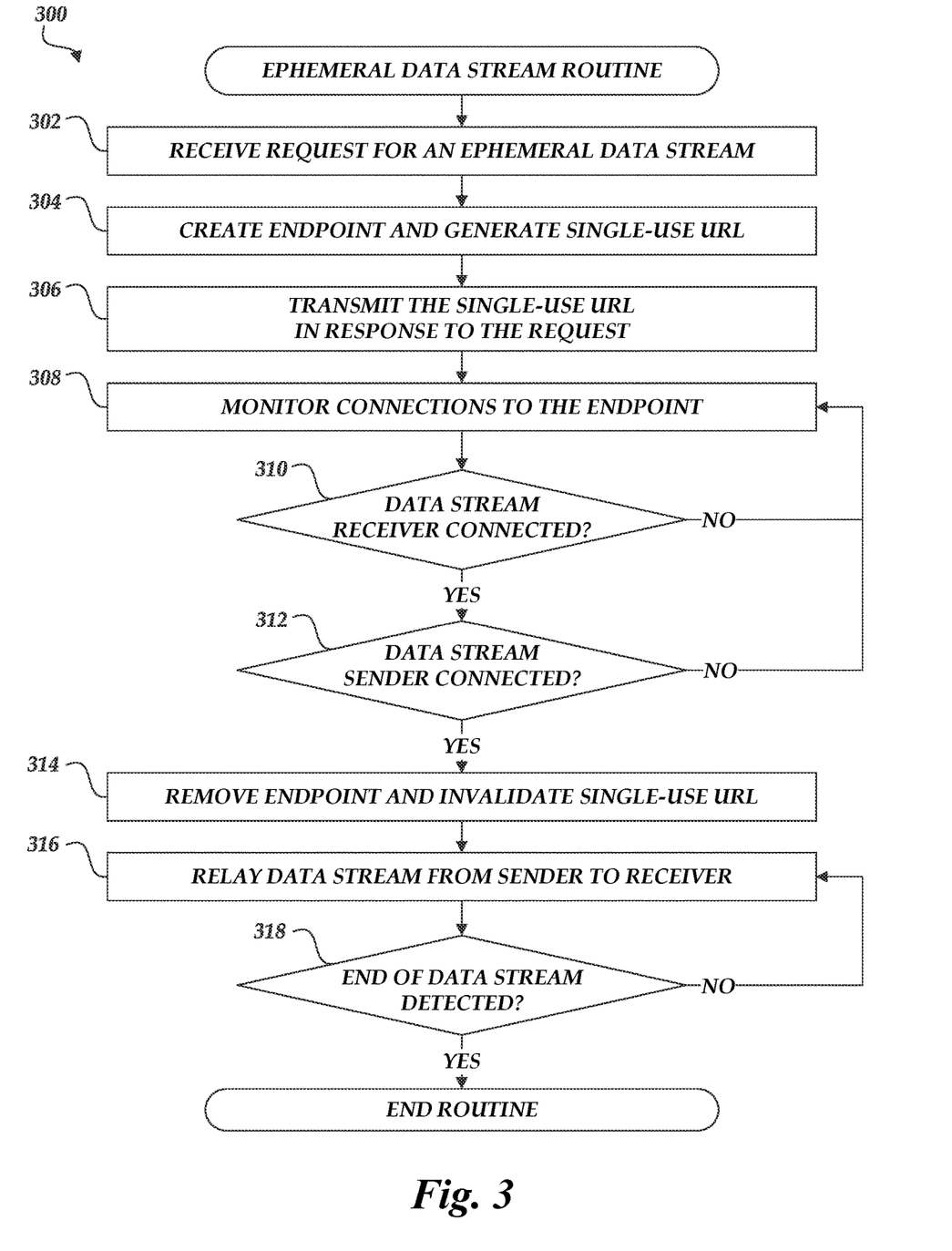
FIG. 3 is a flowchart depicting an example routine for transmitting a data stream between computing devices via an ephemeral data stream routing service in accordance with aspects of the present disclosure.

FIG. 3 is a flowchart depicting an example routine 300 for establishing and managing an ephemeral data stream between computing devices in accordance with aspects of the present disclosure. The routine 300 may be carried out, for example, by one of the data stream routing devices 114A-C depicted in FIG. 1. The routine 300 begins at block 302, where a request to establish an ephemeral data stream may be received. Illustratively, the request may be received in the form of an API call from a computing device, such as the computing device 102A depicted in FIG. 1.

At block 304, a connection endpoint may be created and a single-use URL may be generated. In some embodiments, as described above, the endpoint may be created as a side effect of generating the single-use URL or as a side effect of storing information regarding the single-use URL in a data store. The single-use URL may illustratively be generated using any technique that produces a distinct URL for each request. For example, the single-use URL may be generated based on a time at which the request was received, or by incrementing a counter or other function that returns unique values. In some embodiments, as described above, the single-use URL may include a string that identifies the data stream routing device that generated the URL, which in further embodiments may cause the URL to resolve to that data stream routing device.

In some embodiments, a single-use URL may be obtained at block 304 rather than being generated. For example, a single-use URL may be selected from a pool of previously generated single-use URLs. In further embodiments, individual URLs in a pool of single-use URLs may be recycled after sufficient time has passed since the URL was used to ensure that each request for an ephemeral data stream is handled distinctly. At block 306, the single-use URL may be transmitted in response to the request received at block 302.

At block 308, connections to the endpoint created at block 304 may be monitored such that the routine 300 takes no further action until two connections to the endpoint have been made. At decision blocks 310 and 312, determinations are made as to whether connections have been made by a sender and a receiver of the ephemeral data stream; if either of these determinations is that the connection has not been made, then the routine 300 returns to block 308 and continues monitoring until both connections have been made. In some embodiments, as described above, the connections to the endpoint may indicate whether the device making the connection intends to send or receive the data stream (e.g., by transmitting an HTTP GET or PUT request when making the connection). In other embodiments, the connections may not indicate which device is which. The routine 300 may thus determine whether or not two connections have been made to the endpoint, and then identify which connection is the sender when that device begins transmitting the data stream.

In some embodiments, as described above, the connection made at block 302 when receiving the request for an ephemeral data stream may be used as one of the connections to the endpoint. In such embodiments, one of the decision blocks 310 or 312 may be omitted and the computing device that transmitted the request may use the connection made at block 302 rather than making a separate connection to the endpoint. The routine 300 may thus make a single determination as to whether a connection has been made by a computing device using the single use URL, which may be either the sender or the receiver of the data stream.

If both determinations at decision blocks 310 and 312 are that a connection has been made to the endpoint, then the routine 300 branches to block 314, where the endpoint is removed and the single-use URL is invalidated. As described above, the single-use URL may be invalidated by writing status information to the common data store that indicates it has been used, by removing or deallocating a resource associated with the endpoint, or by otherwise causing further attempts to connect to the endpoint to be rejected and/or receive an error message.

At block 316, the data stream may be relayed from the sending computing device to the receiving computing device. In some embodiments, as described in more detail above, the determinations at decision blocks 310 and 312 may be carried out by different ephemeral data stream routing devices, and the data stream may be relayed from one ephemeral data stream routing device to another. For example, the ephemeral data stream routing device that carries out decision block 310 and connects with the device receiving the data stream may write to a common data store (e.g., the ephemeral routing data store 116 depicted in FIG. 1) to indicate that it has received that connection. The ephemeral data stream routing device that carries out decision block 312 and connects with the device sending the data stream may then read from the common data store to determine where it should transmit the data stream. In some embodiments, blocks 302, 304, and 306 may be carried out by a first ephemeral data stream routing device, which may write the single-use URL it generates to the common data store. Blocks 308, 310, and 312 may then be carried out by each of a fleet of ephemeral data stream routing devices, and two of these devices may receive connections to the endpoint, verify that the endpoint is valid by reading its status from the common data store, and then branch to block 314 and begin relaying the data stream.

At decision block 318, a determination may be made as to whether the data stream has ended. In some embodiments, the determination may be as to whether the sending computing device has closed its connection or transmitted an explicit end-of-stream signal. In other embodiments, the determination may be as to whether a threshold amount of time has elapsed since the sending computing device last transmitted any data, or whether some other condition has been met that indicates the endpoint is no longer in use. In some embodiments, the determination may be as to whether the receiving computing device has closed its connection, stopped accepting data (e.g., using flow control or other signals) for a threshold amount of time, or otherwise satisfied a condition that indicates the data stream should end. If the determination at decision block 318 is that the data stream is still in progress, then the routine 300 returns to block 316 and continues relaying the data stream.

If the determination at decision block 318 is that the data stream has ended (and/or that one of the computing devices has disconnected or should be disconnected, as described above), then the routine 300 ends.

It will be understood that FIG. 3 is provided for purposes of example, and that many variations on the routine 300 are within the scope of the present disclosure. For example, as described above, blocks 302, 304, and 306 may be carried out as a separate routine, and the remaining blocks of the routine 300 may be carried out by several individual data stream routing devices, two of which may branch to block 314 and relay the data stream between them. As a further example, block 302 may be omitted and the single-use URL may be transmitted at block 306 in response to a criterion being satisfied or some other event occurring. FIG. 3 is thus understood to be illustrative and not limiting.

Figure 4:
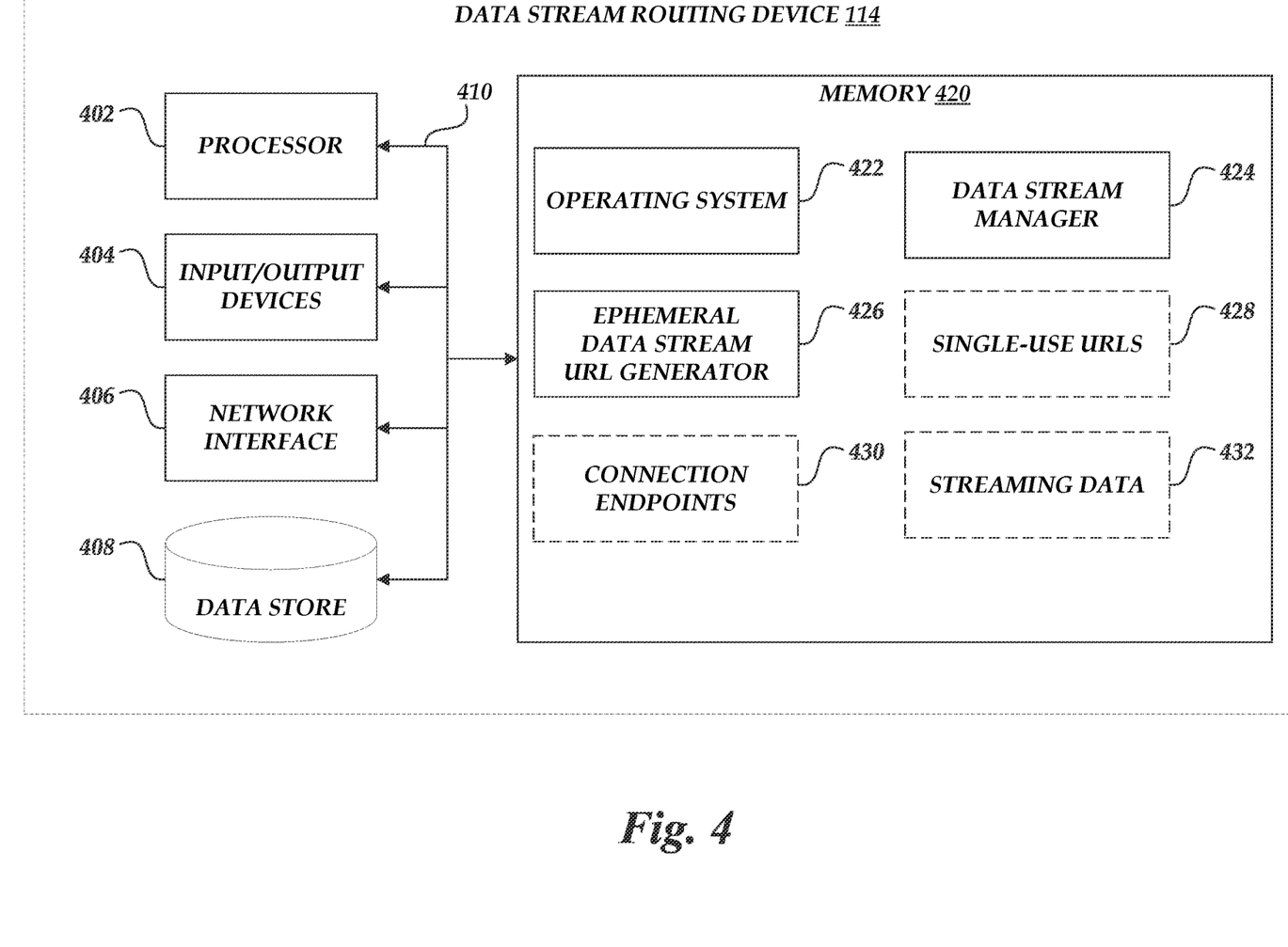
FIG. 4 depicts a general architecture of a computing device that is used by an ephemeral data stream routing service to route data streams in accordance with aspects of the present disclosure.

FIG. 4 depicts a general architecture of a computing system, referenced as a data stream routing device 114, that operates to route data streams between external devices (e.g., the computing devices 102A and 102B depicted in FIG. 1), and in some embodiments to or from other data stream routing devices 114, in accordance with aspects of the present disclosure. The general architecture of the data stream routing device 114 depicted in FIG. 4 includes an arrangement of computer hardware and software modules that may be used to implement aspects of the present disclosure. The hardware modules may be implemented with physical electronic devices, as discussed in greater detail below. The data stream routing device 114 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1.

The data stream routing device 114 includes a processor 402, input/output device interfaces 404, a network interface 406, and a data store 408, all of which may communicate with one another by way of a communication bus 410. The network interface 406 may provide connectivity to one or more networks or computing systems. The processor 402 may thus receive information and instructions from other computing systems or services via, e.g., the network 104 depicted in FIG. 1. The processor 402 may also communicate to and from a memory 420 and further provide output information for an optional display (not shown) via the input/output device interfaces 404. The input/output device interfaces 404 may also accept input from an optional input device (not shown). The data store 408 may generally be any non-transitory computer-readable data store, including but not limited to hard drives, solid state devices, magnetic media, flash memory, and the like. In some embodiments, the data store 408 may be implemented as a database, web service, or cloud computing service, and may be external to the data stream routing device 114. For example, in some embodiments, the data store 408 may be implemented as the ephemeral routing data store 116 depicted in FIG. 1. Additionally, in various embodiments, the data store 408 may be implemented as a single data store or distributed across multiple data stores.

The memory 420 may contain computer program instructions (grouped as modules in some embodiments) that the processor 402 executes in order to implement one or more aspects of the present disclosure. The memory 420 generally includes random access memory (RAM), read only memory (ROM) and/or other persistent, auxiliary or non-transitory computer readable media. The memory 420 may store an operating system 422 that provides computer program instructions for use by the processor 402 in the general administration and operation of the data stream routing device 114. The memory 420 may further include computer program instructions and other information for implementing aspects of the present disclosure. In addition, the memory 420 may include and/or communicate with one or more data repositories (not shown), for example, to access user program codes and/or libraries.

In the illustrated embodiment, the memory 420 includes a data stream manager 424, which may implement aspects of the present disclosure such as carrying out all or part of the routine 300 described in FIG. 3. For example, the data stream manager 424 may handle processing of connections from other computing devices (e.g., via the network interface 406) and routing of data streams to and from these connections. The memory 420 further includes an ephemeral data stream URL generator, which may generate single-use URLs as described above. In some embodiments, the ephemeral data stream URL generator may also create and remove endpoints, e.g. by writing information to and from the data store 408 or a common data store shared with other data stream routing devices 114.

The memory 420 further includes single-use URLs 428, which may be generated by the ephemeral data stream URL generator 426, received from external computing devices, retrieved from a data store 408 or a common data store, or combinations thereof. In some embodiments, the data stream manager 424 may determine whether a received single-use URL locates an endpoint that is currently valid, and thereby determine whether to send or receive a data stream from a computing device that has invoked the single-use URL. In some embodiments, the memory 420 further contains valid connection endpoints 430 that are located by the single-use URLs 428. The memory 420 further contains streaming data 432 that is being relayed from one external computing device to another (or, in some embodiments, from an external computing device to another data stream routing device 114).

In some embodiments, the data stream routing device 114 may include further components other than those illustrated in FIG. 4. For example, the memory 420 may include information that identifies other data stream routing devices 114 as senders or receivers of data streams associated with certain connection endpoints 430, or may include information regarding the status of a data stream (e.g., whether the sender has timed out) in addition to the data that is being streamed. FIG. 4 is thus understood to be illustrative but not limiting.

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for providing ephemeral data streams, the system comprising:
    a data store; and
    a processor in communication with the data store, wherein the processor executes computer-executable instructions stored in the data store to perform operations including:
        receiving, from a first computing device, a request to pass an ephemeral data stream from the first computing device to a second computing device;
        creating an ephemeral data stream connection endpoint, wherein the ephemeral data stream connection endpoint enables a data stream connection between two computing devices;
        generating an ephemeral data stream uniform resource locator ("URL") that locates the ephemeral data stream connection endpoint;
        transmitting the ephemeral data stream URL to at least one computing device of the first computing device and the second computing device, wherein transmitting the ephemeral data stream URL to the at least one computing device causes the at least one computing device to transmit the ephemeral data stream URL to the other computing device of the first computing device and the second computing device;
        receiving, from the first computing device, a first connection to the ephemeral data stream connection endpoint, the first connection made using the ephemeral data stream URL;
        receiving, from the second computing device, a second connection to the ephemeral data stream connection endpoint, the second connection made using the ephemeral data stream URL;
        passing the ephemeral data stream, as received from the first computing device via the first connection to the ephemeral data stream connection endpoint, to the second computing device via the second connection to the ephemeral data stream connection endpoint;
        determining that the ephemeral data stream has ended; and
        removing the ephemeral data stream connection endpoint.

2. The system of claim 1, wherein removing the ephemeral data stream connection endpoint causes any further attempts to connect to the ephemeral data stream connection endpoint to return an error message.

3. The system of claim 1, wherein passing the ephemeral data stream from the first computing device to the second computing device comprises:
    receiving, via the first connection to the ephemeral data stream connection endpoint, streaming data from the first computing device; and
    transmitting, via the second connection to the ephemeral data stream connection endpoint, the streaming data to the second computing device.

4. The system of claim 3, wherein a first portion of the streaming data is received from the first computing device while a second portion of the streaming data is transmitted to the second computing device.

5. The system of claim 1, wherein removing the ephemeral data stream connection endpoint closes one or more of the first connection or the second connection.

6. A computer-implemented method comprising:
    receiving, from a first computing device via a first connection, a request to pass an ephemeral data stream from the first computing device to a second computing device;
    generating an ephemeral data stream uniform resource locator ("URL") that locates an ephemeral data stream connection endpoint, wherein the ephemeral data stream connection endpoint enables the ephemeral data stream between the first connection made by the first computing device and a second connection made by the second computing device;
    causing at least one of the first computing device and the second computing device to receive the ephemeral data stream URL;
    receiving, from the second computing device, the second connection, the second connection made to the ephemeral data stream connection endpoint using the ephemeral data stream URL;
    removing the ephemeral data stream connection endpoint in response to receiving the second connection; and
    passing the ephemeral data stream received from the first computing device via the first connection to the ephemeral data stream connection endpoint to the second computing device via the second connection to the ephemeral data stream connection endpoint.

7. The computer-implemented method of claim 6, wherein the first connection from the first computing device comprises a hypertext transfer protocol ("HTTP") PUT request.

8. The computer-implemented method of claim 6, wherein the second connection from the second computing device comprises an HTTP GET request.

9. The computer-implemented method of claim 6, wherein the ephemeral data stream connection endpoint is obtained from a pool of previously generated ephemeral data stream connection endpoints.

10. The computer-implemented method of claim 6, wherein the first connection to the ephemeral data stream connection endpoint is received after the second connection to the ephemeral data stream connection endpoint is received.

11. The computer-implemented method of claim 6, wherein the request to pass the ephemeral data stream identifies one or more of the first computing device or the second computing device.

12. The computer-implemented method of claim 6 further comprising:
    after removing the ephemeral data stream connection endpoint, receiving, from a third computing device, an attempt to connect to the ephemeral data stream connection endpoint; and
    transmitting an error message to the third computing device.

13. The computer-implemented method of claim 6, wherein the first connection is received by a first ephemeral data stream routing device, and wherein the second connection is received by a second ephemeral data stream routing device.

14. The computer-implemented method of claim 13 further comprising storing in a data store, by the first ephemeral data stream routing device, an indication that the first ephemeral data stream routing device has received the first connection.

15. The computer-implemented method of claim 14 further comprising:
 obtaining from the data store, by the second ephemeral data stream routing device, the indication that the first ephemeral data stream routing device has received the first connection,
 wherein passing the ephemeral data stream from the first computing device to the second computing device comprises establishing, by the second ephemeral data stream routing device, a connection between the second ephemeral data stream routing device and the first ephemeral data stream routing device.

16. A system comprising:
 a data store; and
 a processor in communication with the data store, wherein the processor executes computer-executable instructions stored in the data store to perform operations including:
  obtaining an ephemeral data stream uniform resource locator ("URL") that locates an ephemeral data stream connection endpoint, wherein the ephemeral data stream connection endpoint enables a data stream connection between two computing devices;
  passing an ephemeral data stream received from a first computing device to a second computing device via a first connection to the ephemeral data stream connection endpoint made by the first computing device and a second connection made to the ephemeral data stream connection endpoint by the second computing device using the ephemeral data stream URL; and
  removing the ephemeral data stream connection endpoint in response to receiving the second connection made using the ephemeral data stream URL.

17. The system of claim 16, wherein obtaining the ephemeral data stream URL is in response to a request from the first computing device.

18. The system of claim 16, wherein removing the ephemeral data stream connection endpoint comprises storing, in the data store, an indication that the ephemeral data stream connection endpoint has previously been used to establish a data stream.

19. The system of claim 16, wherein obtaining the ephemeral data stream URL comprises selecting the ephemeral data stream URL from a pool of ephemeral data stream URLs.

* * * * *